US009268540B2

(12) United States Patent
Tian et al.

(10) Patent No.: US 9,268,540 B2
(45) Date of Patent: Feb. 23, 2016

(54) CODE GENERATION USING DATA MARKING

(71) Applicant: International Business Machines Corporation, Armonk, NY (US)

(72) Inventors: Ye Tian, Markham (CA); Alexander Vasilevskiy, Markham (CA)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 14/055,097

(22) Filed: Oct. 16, 2013

(65) Prior Publication Data

US 2014/0123102 A1 May 1, 2014

(30) Foreign Application Priority Data

Nov. 1, 2012 (CA) ...................................... 2794154

(51) Int. Cl.
G06F 9/45 (2006.01)
(52) U.S. Cl.
CPC ...................................... *G06F 8/441* (2013.01)
(58) Field of Classification Search
None
See application file for complete search history.

(56) References Cited

U.S. PATENT DOCUMENTS

| 7,770,161 | B2 | 8/2010 | Mitran et al. |
| 8,104,026 | B2 | 1/2012 | Koseki et al. |
| 8,161,467 | B2 | 4/2012 | Koseki et al. |
| 8,166,450 | B2 * | 4/2012 | Fuhler et al. ................... 717/101 |
| 2006/0158354 | A1 | 7/2006 | Aberg et al. |

OTHER PUBLICATIONS

Authors et al.: Disclosed Anonymously, "Using Use Distance Between All Pairs of Automatics to Map Stack on a Machines With Small Displacement Instructions," an IP.com Prior Art Database Technical Disclosure; IP.com No. IPCOM000214169D; IP.com Electronic Publication Date: Jan. 13, 2012; 3 pages.
I. Baev, "Techniques for Region-Based Register Allocation," IEEE Computer Society2009 International Symposium on Code Generation and Optimization; pp. 147-0156.
Y. Wang, et al., "Register Allocation by Model Transformer Semantics," Indiana University, Feb. 24, 2012; pp. 1-12.

\* cited by examiner

*Primary Examiner* — Chuck Kendall
(74) *Attorney, Agent, or Firm* — Cantor Colburn LLP (57) ABSTRACT

Embodiments relate to generating short displacement instructions. An aspect includes performing code generation by a compiler to generate an instructions. Another aspect includes determining whether the generated instruction supports long displacement. Another aspect includes based on a determination that the generated instruction does not support long displacement, determining whether a short displacement budget is full. Another aspect includes based on a determination that the short displacement budget is not full, marking data associated with the instruction in a symbol table maintained by the compiler. Another aspect includes incrementing the short displacement budget using a size of the marked data associated with the instruction. Another aspect includes based on a determination that the short displacement budget is full, performing a low cost fix up.

17 Claims, 8 Drawing Sheets

Displacement fixup system
300

CODE GENERATION USING DATA MARKING

PRIORITY

This application claims priority to Canadian Patent Application No. 2794154, filed Nov. 1, 2012, and all the benefits accruing therefrom under 35 U.S.C. §119, the contents of which in its entirety are herein incorporated by reference.

BACKGROUND

The present disclosure relates generally to programming languages and compilers in a data processing system and more specifically to program stack management in the data processing system.

Typical computer hardware architectures provide an instruction set comprising instructions with a displacement field for accessing memory locations. For example, an instruction having a base plus displacement format, referred to as base plus offset. In this format a load register instruction has an effective address equal to the displacement value plus the contents of a specified base register.

In another example, an instruction may be of a form of base plus index plus displacement, which is referred to as base plus index plus offset. In this format the load register instruction has an effective address equal to the displacement value plus the contents of a specified base register and the contents of a specified index register.

In a further example as computer hardware architecture evolves, the architecture expands to support multiple sets of instructions used to access memory comprising a short displacement format and a long displacement format. In the short displacement format, the instruction is defined as a traditional 12-bit (short) displacement instruction. Using this type of instruction enables a maximum addressing of +4,095 bytes from the origin (base address). In contrast the long displacement format, defines as an extended 20-bit signed (long) displacement instruction. Using this type of instruction enables a maximum addressing between −524,288 bytes and +524,287 (512K) bytes from the origin (base address). This type of instruction has 8 additional bits appended to the left of the 12-bit displacement (as in the short displacement instruction).

A 20-bit signed displacement enables relative addressing of up to 524,287 bytes beyond the location that is designated by a base register or base-and-index-register pair and up to 524,288 bytes prior to that location. Examples of instruction pairs supporting both short and long displacement as supported in one commercially available example system (z/OS® is a 64-bit operating system for System z® computers, produced by IBM® IBM, z/OS, System z are registered trademarks of IBM Corporation in the United States, other countries, or both) include operation codes of L/LY, LA/LAY, ST/STY, (and other pairs of this type). Examples of additional instructions, which only support a short displacement type, include operation codes of MVC, CLC, and other instructions of this type.

In a typical compiler implementation when instructions are generated the displacement is not known at compilation time and the compiler has to make assumptions about the displacement field. The displacement is known after a stack mapping stage, which occurs after instructions are generated. Therefore when short displacement-only instructions are generated a compiler cannot determine whether corresponding offsets will fit into the short displacement field.

When the offset does not fit into the short displacement, a fix-up to re-create the offset in a separate register is required. The separate register is added to the original displacement and later used as a base register for the particular instruction. Pessimistic assumptions by the compiler for the displacement field result in unnecessary up-front fix-ups whereas optimistic assumptions result in expensive fix-ups for the data that does not fit in the displacement field.

Typical attempts to mitigate the displacement size problem typically use an early stack mapping stage. The early stack mapping stage is performed before instructions are generated providing an estimate of the respective displacements. However a disadvantage of this approach arises when displacements are not accurately computed (for example, extra temps for register spilling can introduce distortions). As well this technique does not consider how the data is used and may inadvertently penalize instructions in a hot areas of the code for the benefit of the infrequently executed sections of the code (cold areas of code).

BRIEF SUMMARY

Embodiments of a method, computer program product, and apparatus for generating short displacement instructions are provided. An aspect includes performing code generation by a compiler to generate an instructions. Another aspect includes determining whether the generated instruction supports long displacement. Another aspect includes based on a determination that the generated instruction does not support long displacement, determining whether a short displacement budget is full. Another aspect includes based on a determination that the short displacement budget is not full, marking data associated with the instruction in a symbol table maintained by the compiler. Another aspect includes incrementing the short displacement budget using a size of the marked data associated with the instruction. Another aspect includes based on a determination that the short displacement budget is full, performing a low cost fix up.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Various embodiments will now be described, by way of example only, with reference to the following drawings in which.

DETAILED DESCRIPTION

Embodiments of code generation using data marking are provided, with exemplary embodiments being discussed below in detail. According to one embodiment, a computer-implemented block for generating short displacement instructions comprises performing code generation by a compiler to generate an instruction, determining, by a computer, whether the generated instruction supports long displacement and responsive to a determination that the generated instruction does not support long displacement, determining whether a short displacement budget is full. Responsive to a determination that the short displacement budget is not full, mark data associated with the instruction in a symbol table maintained by the compiler, increment the short displacement budget using a size of the marked data associated with the instruction and responsive to a determination that the short displacement budget is full, perform a low cost fix up.

According to another embodiment, a computer program product for generating short displacement instructions comprises a computer recordable-type media containing computer executable program code. The computer executable program code further comprising computer executable program code for performing code generation by a compiler to generate an instruction, computer executable program code for determining, by a computer, whether the generated instruction supports long displacement. Computer executable program code responsive to a determination that the generated instruction does not support long displacement, for determining whether a short displacement budget is full, computer executable program code responsive to a determination that the short displacement budget is not full, for marking data associated with the instruction in a symbol table maintained by the compiler, computer executable program code incrementing the short displacement budget using a size of the marked data associated with the instruction and computer executable program code responsive to a determination that the short displacement budget is full, for performing a low cost fix up.

According to another embodiment, an apparatus for generating short displacement instructions comprising a communications fabric; a memory connected to the communications fabric, wherein the memory contains computer executable program code; a communications unit connected to the communications fabric; an input/output unit connected to the communications fabric; a display connected to the communications fabric and a processor unit connected to the communications fabric. The processor unit executes the computer executable program code to direct the apparatus to perform code generation by a compiler to generate an instruction and to determine whether the generated instruction supports long displacement. Responsive to a determination that the generated instruction does not support long displacement, determine whether a short displacement budget is full. Responsive to a determination that the short displacement budget is not full, mark data associated with the instruction in a symbol table maintained by the compiler, increment the short displacement budget using a size of the marked data associated with the instruction and responsive to a determination that the short displacement budget is full, perform a low cost fix up.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, various embodiments may take the form of a computer program product embodied in one or more computer readable medium(s) having computer readable program code embodied thereon.

Any combination of one or more computer-readable data storage medium(s) may be utilized. A computer-readable data storage medium may be, for example, but not limited to, an electronic, magnetic, optical, or semiconductor system, apparatus, or device, or any suitable combination of the foregoing. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing. In the context of this document, a computer-readable data storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to various embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer-implemented block such that the instructions which execute on the computer or other programmable apparatus provide processes for implementing the functions/acts specified in the flowchart and/or block diagram block or blocks.

Figure 1:
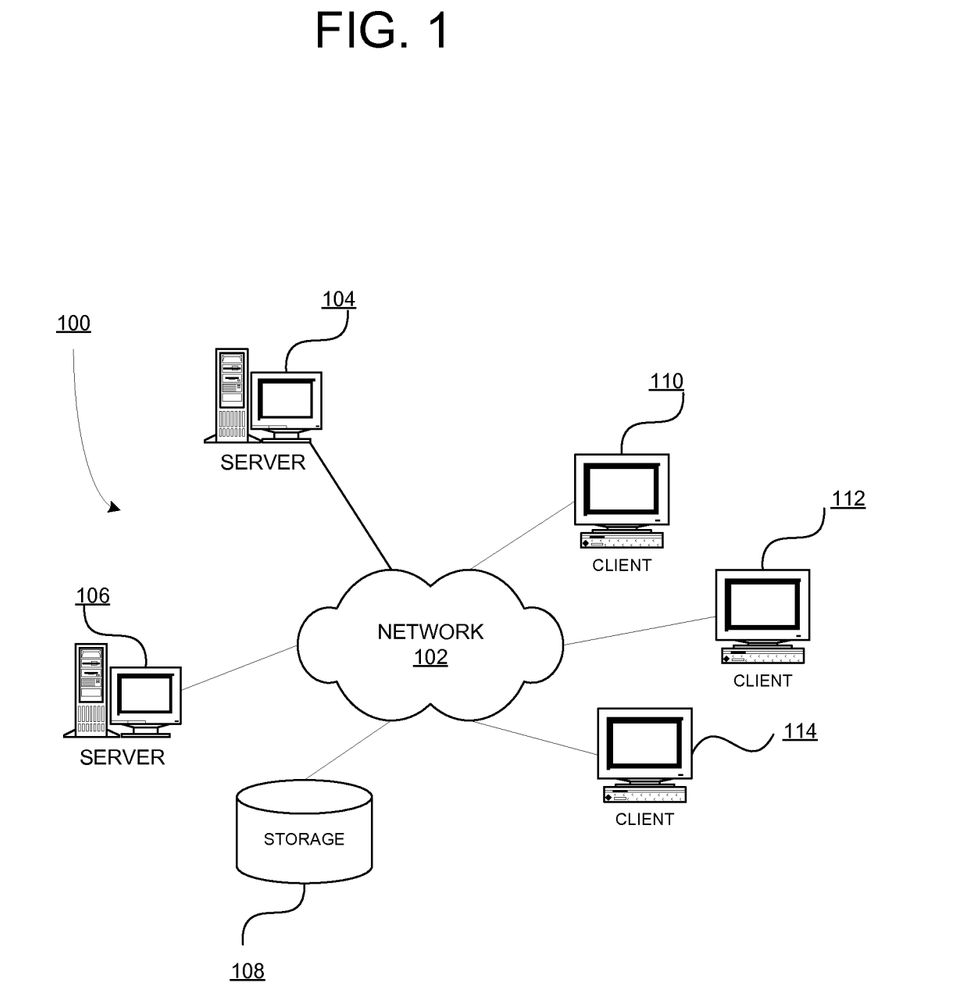
FIG. 1 is a block diagram of an exemplary network data processing system operable for various embodiments of the disclosure.
Figure 2:
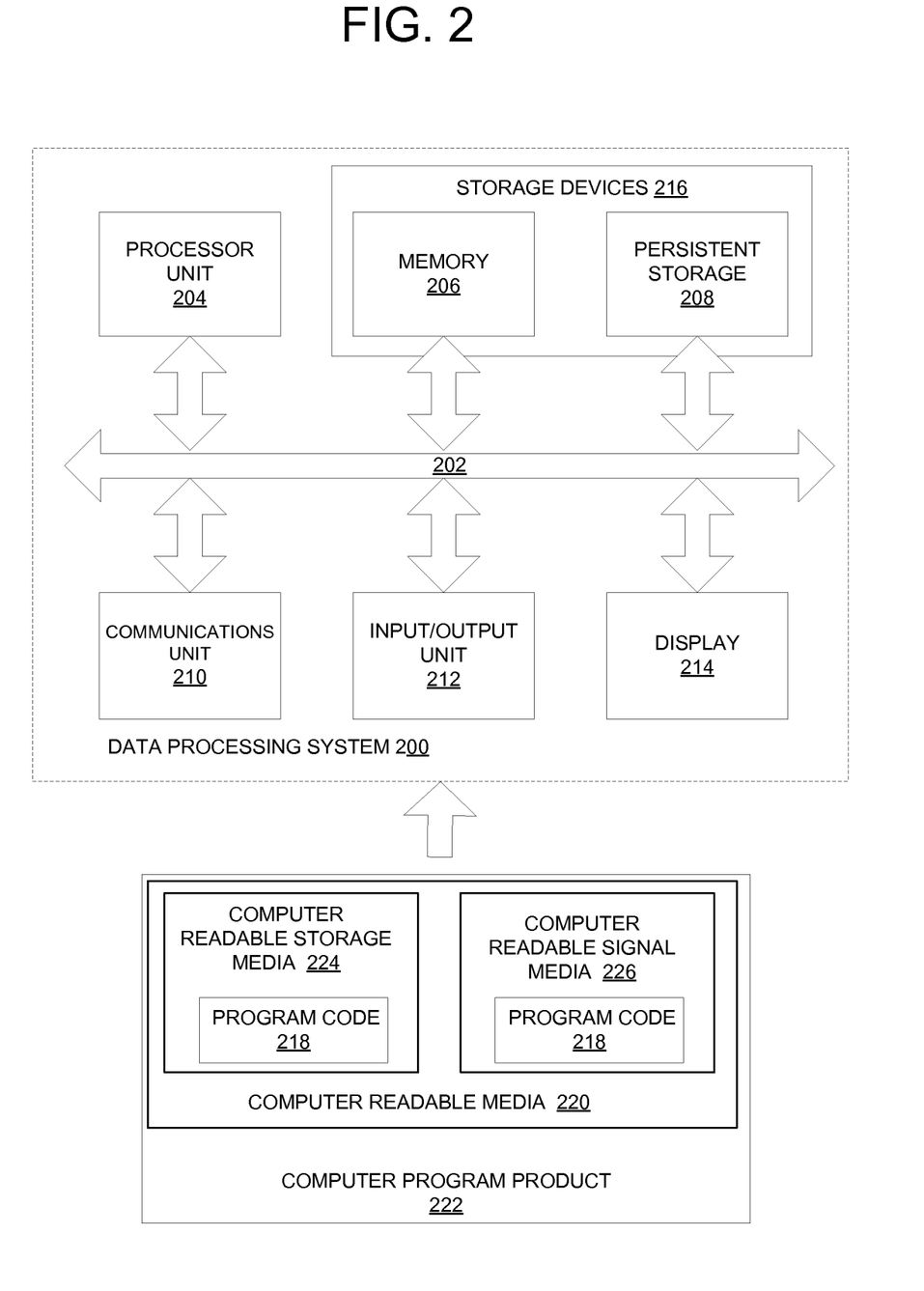
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented block for generating short displacement instructions is presented. Processor unit 204 performs code generation using a compiler to generate an instruction, and determines whether the generated instruction supports long displacement. Responsive to a determination that the generated instruction does not support long displacement, processor unit 204 determines whether a short displacement budget is full. Responsive to a determination that the short displacement budget is not full, processor unit 204 marks data associated with the instruction in a symbol table maintained by the compiler, increments the short displacement budget using a size of the marked data associated with the instruction. Responsive to a determination that the short displacement budget is full, processor unit 204 performs a low cost fix up. The fix up operation includes performing separate stack mapping for marked and unmarked data, and combining the two stacks in order.

Distinguishing features of the disclosed block over previous solutions include placement of data that may require adjustment pro-actively in a low portion of the stack to eliminate potential adjustments rather than passively reacting with adjustments for such data and the use of profiling data, to ensure hot code receives priority over cold code.

Embodiments of the disclosed block utilize a fast linear method for efficient generation of code to minimize fix-ups costs. Marking data that participates in instructions not supporting long displacement and maintaining a budget for such data enables efficiency in time and cost. In one example, marking is performed greedily on a first in first out basis. More sophisticated schemas for marking can be added at an expense of extra compile time.

When a predetermined budget is reached a low-cost fix-up is generated. Specially marked data is later mapped to a lower portion of the stack.

The disclosed block also uses profiling data collected separately. Use of the profile data ensures that when the fix-up operations are required, the operations will typically occur in portions of infrequently executed code.

Figure 3:
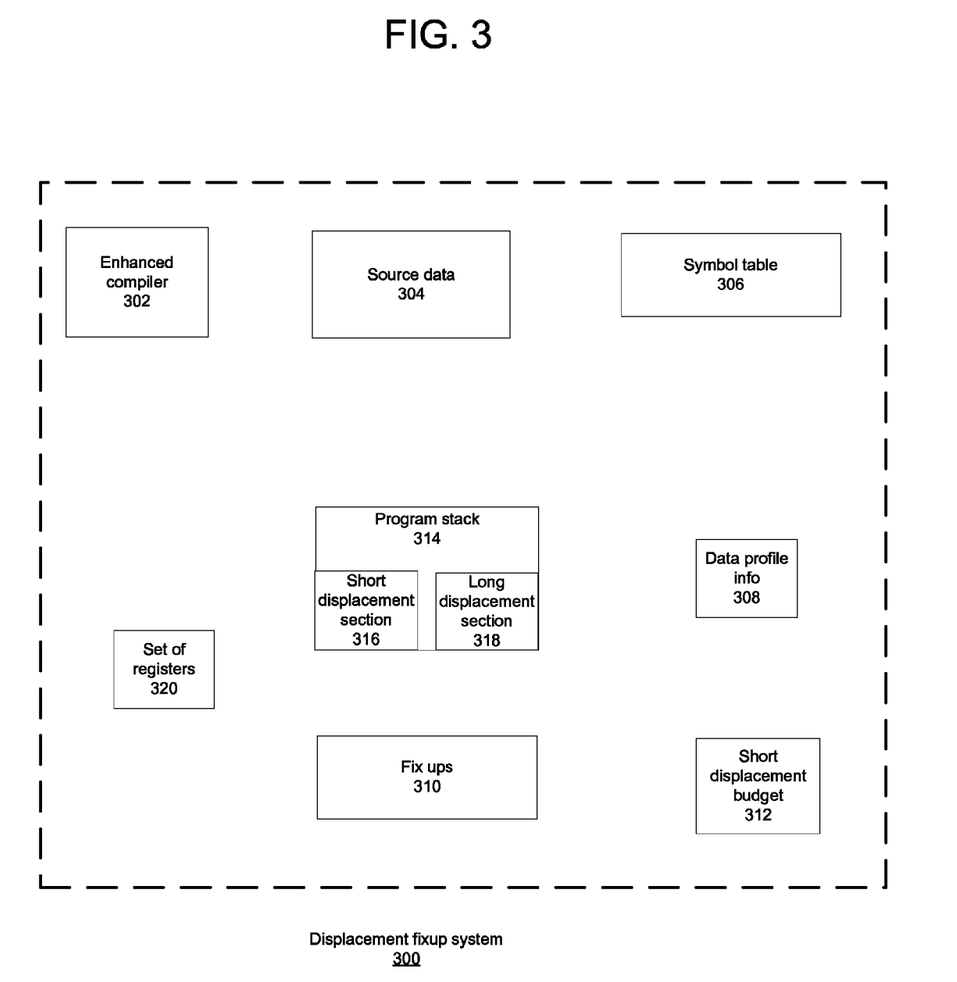
FIG. 3 is a block diagram representation of a displacement fix up system operable for various embodiments of the disclosure.

With reference to FIG. 3 a block diagram representation of a displacement fix up system operable for various embodiments of the disclosure is presented. The illustrative embodiment is an example of a configuration of a displacement fix up system of the disclosure in which data participating in instructions which do not support long displacement is marked and monitoring a budget for such data. The examples provided are in reference to the instruction set of the previously mentioned z/OS but are applied equally well to instruction set architectures supporting multiple modes of addressing.

Displacement fix up system 300 comprises a number of components leveraging support of an underlying data processing system such as data processing system 200 of FIG. 2. Components of displacement fix up system 300 comprise a set of components including enhanced compiler 302, source data 304, symbol table 306, data profile info 308, fix ups 310, short displacement budget 312, program stack 314 including short displacement section 316 and long displacement section 318, and set of registers 320. Displacement fix up system 300 as presented in FIG. 3 is an example only. Other configuration of components may be used wherein the capability of individual components is combined in to larger components as needed. Alternatively all components may be collected into a monolithic component without departing from the block of the disclosure.

Enhanced compiler 302 provides a capability to analyze instructions as they are generated to determine whether the instruction supports long displacement. The enhanced compiler continues with a block, as described in further detail in the following sections, to determine whether which section of the program stack is used, whether the associated data is marked, and whether a predetermined budget for such instruction processing is reached. Enhanced compiler 302 is therefore enabled to block instructions according to set of predetermined conditions into alternative paths of the disclosed block.

Source data 304 provides a typical source of instructions forming an instruction stream to enhanced compiler 302. The instruction stream may contain short displacement instructions, long displacement instructions of a mix of short displacement instructions and long displacement instructions.

Symbol table 306 provides a capability to indicate a condition of whether a condition applies to data associated with a short displacement instruction. In the disclosed block the particular condition for data marking is a case in which data is associated with a short displacement instruction and the short displacement budget is not full, otherwise marking will not occur.

Data profile info 308 provides a capability of indicating whether code being compiled is in an area defined to be hot or an area defined to be cold. A hot area of code is one in which execution of associated instruction occurs frequently relative to instruction execution in an area defined as cold. The frequency may be determined by an installation, however the distinction between a hot area and a cold area is relative.

Fix ups 310 provides a set of defined operations to add instructions to a selected area of code based on analysis performed during instruction generation. Responsive to a set of conditions at least one of a set of fix up operations is performed. For example, using the disclosed block when a short displacement budget indicates space is available for only a first data of a first and second data associated with a short displacement instruction, the first data is placed in a short displacement stack and the second data has a fix up applied to place the second data in a long displacement stack. In this example, the fix up includes placement first and second data in respective portions of the stack and an additional instruction associated with second data into the code section during compilation. Accordingly a fix up comprises a code change and stack placement.

Short displacement budget 312 provides a capability to tailor a value according to an underlying instruction set implementation. For example, an instruction set comprises instructions of a short displacement type and a long displacement type. The short displacement type provides a capability to address 4095 bytes (4K) from an origin address. The long displacement type provides a capability to address between −524,288 bytes and +524,287 (512K) bytes from an origin address. Using the example, the short displacement budget is thus defined as 4 k. The short displacement budget is reduced by a value of the size of data associated with the short displacement instruction, which is processed in a fix up operation.

Program stack 314 is a data structure in a computer memory with a fixed origin and a variable size. Use of the stack is enabled through a programming interface implementation to allow a user to pop items from or push items onto an array or linked list comprising the data structure. The stack is a linear data structure and the push/pop operations are typically directed to the top of the stack. Other stack operations are available with a few other helper operations. The variable size enables the stack to grow and shrink as data is added and removed.

Short displacement section 316 is a reserved portion of memory allocated for program stack 314. Short displacement section 316 contains data associated with short displacement instructions that can be placed in the short displacement section according to the condition set by short displacement budget 312 and responsive to whether the code being processed is characterized as warm or cold code. Long displacement section 318 is also a reserved portion of memory allocated for program stack 314. Long displacement section 318 contains data associated with short displacement instructions that cannot be placed in the short displacement section according to the condition set by short displacement budget 312. Long displacement section 318 also contains data only associated with short displacement instructions that have a corresponding long displacement instruction, for example instructions L/ST/LA of a previous example. The usage of short displacement section 316 and long displacement section 318 is further described in the following sections of FIG. 4 and FIG. 5.

Set of register 320 provides a capability to use a register, which is not a linkage register, or a register used in the instruction being processed in a fix up block for a particular instruction. A register in set of registers 320 is used to hold a data address temporarily associated with a long displacement stack entry during a fix up operation.

Figure 4:
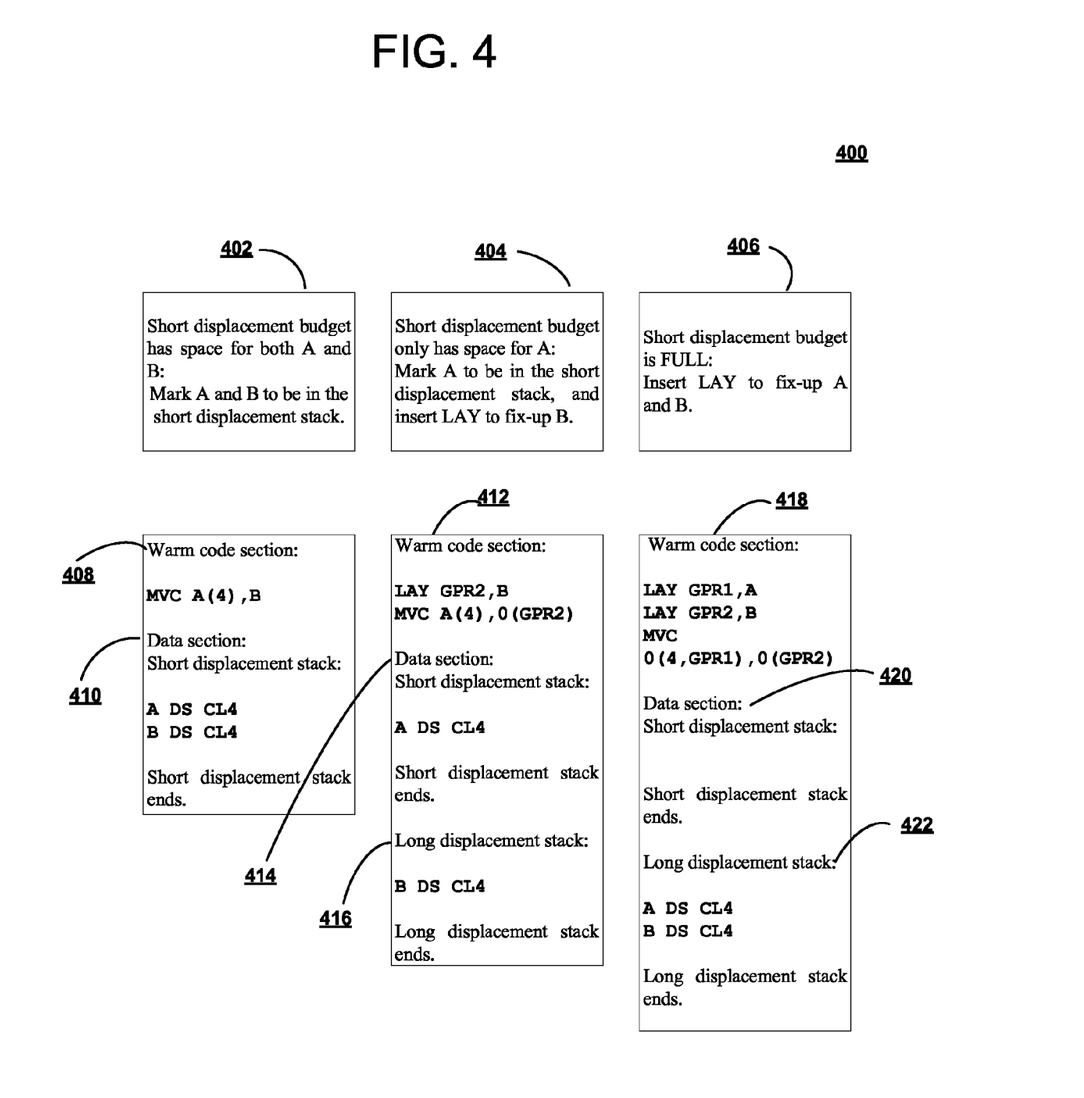
FIG. 4 is a tabular representation of warm block low cost fix up examples in accordance with one embodiment of the disclosure.

With reference to FIG. 4 a tabular representation of warm block low cost fix up examples in accordance with one embodiment of the disclosure is presented. Cost is representative of the number and complexity of changes made to a code section. Example 400 is a set of scenarios in which data marking occurs according to the context of the specific scenario.

In the examples, the following code snippet is used:
char a[4];
char b[4];
memcpy (a, b, 4);

In example 402, a particular instance of a warm block low cost fix up is presented. In this case a short displacement budget has space remaining to accommodate both data sections A and B. Warm code section 408 contains a move instruction, which is a short displacement type of instruction, using A and B. Data section 410 comprises a short stack entry containing both data sections.

In example 404, another particular instance of a warm block low cost fix up scenario is presented in which a short displacement budget has space remaining to only accommodate a data section for A. Warm code section 412 contains a short displacement move instruction using A including a register and an addition of a LAY load instruction of a long displacement type (in the previous example using the instruction set of z/OS). Data section 414 comprises a short displacement stack entry containing a data section for A and stack data section 416 comprises a long displacement stack entry containing a data section for B.

In example 406, another particular instance of a warm block low cost fix up scenario is presented in which a short displacement budget is full and therefore cannot accommodate a data section for A or B. In this case warm code section 418 contains a short displacement move instruction using two registers and a LAY instruction is inserted in a fix up operation for each of A and B.

Data section 420 comprises no entries in the short displacement stack. Long displacement stack 422 contains a long displacement stack entry containing a data section for A and a long displacement stack entry containing a data section for B.

Figure 5:
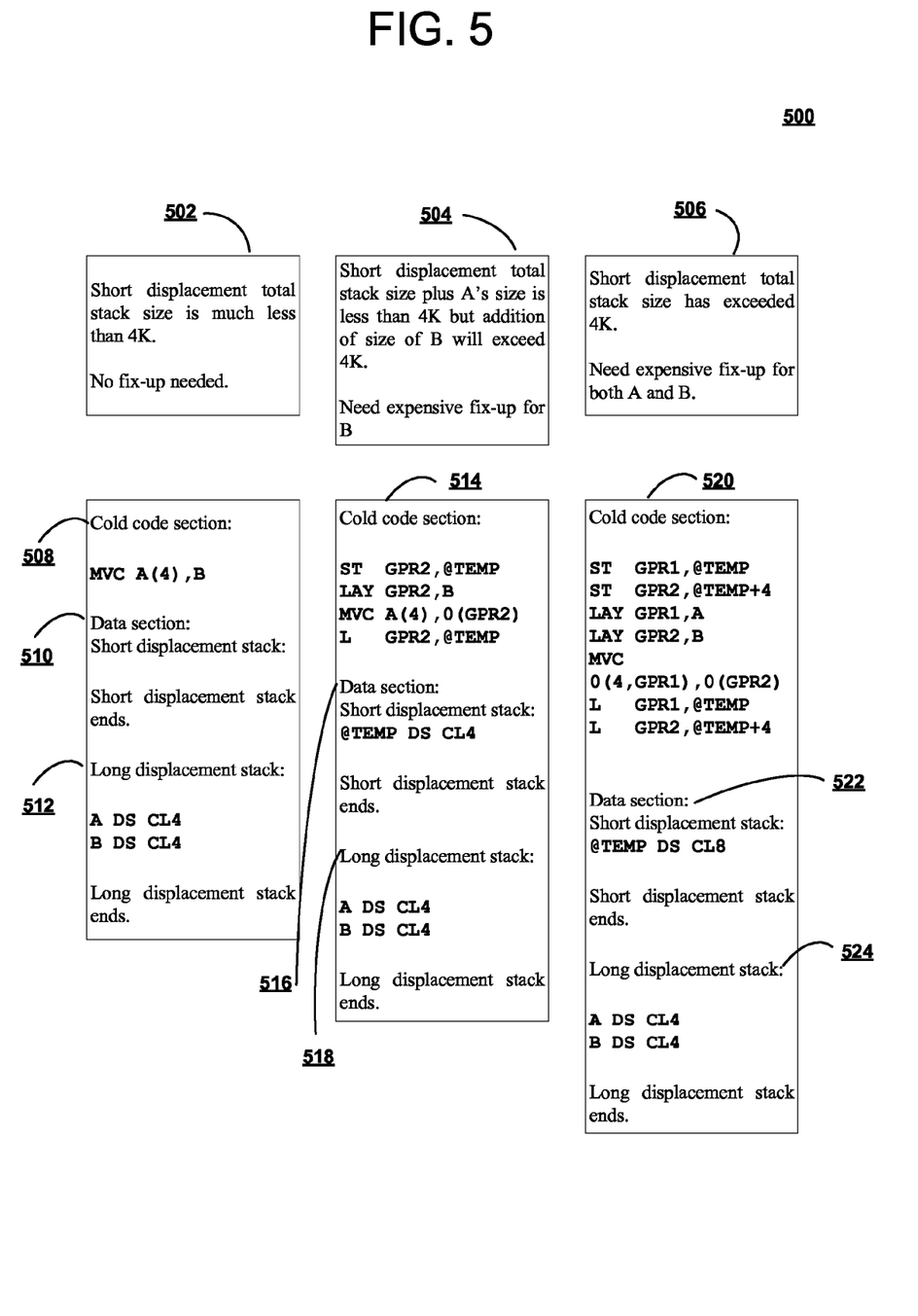
FIG. 5 is a tabular representation of cold block high cost fix up examples in accordance with one embodiment of the disclosure.

With reference to FIG. 5 a tabular representation of cold block high cost fix up examples in accordance with one embodiment of the disclosure is presented. Example 500 is a set of scenarios in which data marking occurs according to the context of the specific cold block expensive fix up scenario. In the examples, the code snippet associated with the previous example of FIG. 4 and the instruction set referenced in previous examples is used.

In example 502, a particular instance of a cold block expensive fix up is presented. In this case a short displacement stack has space remaining to accommodate both data sections A and B. Cold code section 508 contains a move instruction, which is a short displacement type of instruction, using A and B. Data section 510 comprises no entry. Data section 512 comprises two entries containing both data sections for A and B. However no fix up operation was deemed necessary due to the availability of space in the short displacement stack.

In example 504, another instance of a cold block expensive fix up is presented. In this case a short displacement total stack size plus the space required to accommodate a data section for A is available. When a data size associated with B is considered the remaining portion of short displacement total stack size cannot accommodate B. Therefore there is a need to perform an expensive fix up for B.

Cold code section 514 contains a move instruction, which is a short displacement type of instruction, using A and a register. A long displacement instruction of LAY including a register is added for B. These two instructions are prefaced by a store instruction to spill register contents into memory and followed by a load instruction to restore the memory contents. Other instruction set architectures may use different instructions or combinations of instructions rather than those of the examples.

Data section 516 comprises a short displacement stack entry containing a data section for a temp used accommodate the size of B and referenced in the added load and store instructions. Data section 518 contains long displacement stack entries containing both data sections.

In example 506, another instance of a cold block expensive fix up is presented. In this case a short displacement total stack cannot accommodate a data section for A or for B. Therefore there is a need to perform expensive fix ups for both A and B.

Cold code section 520 contains a move instruction, which is a short displacement type of instruction, using two registers. A long displacement instruction of LAY including a register is added for each of A and B. These three instructions are now prefaced by a store instruction to spill register contents into memory for each of A and B. Each store instruction comprises a selected register and a temp representing either A or B respectively. The initial three instructions are also followed by two load instructions to restore the memory contents. Each load instruction comprises the selected register and the temp representing either A or B respectively to correspond with a previously described store instruction.

Data section 522 comprises a short displacement stack entry containing a data section for a temp (sized to hold both the size of A and B) used in the added load and store instructions. Data section 524 contains long displacement stack entries containing both data sections A and B.

Figure 6:
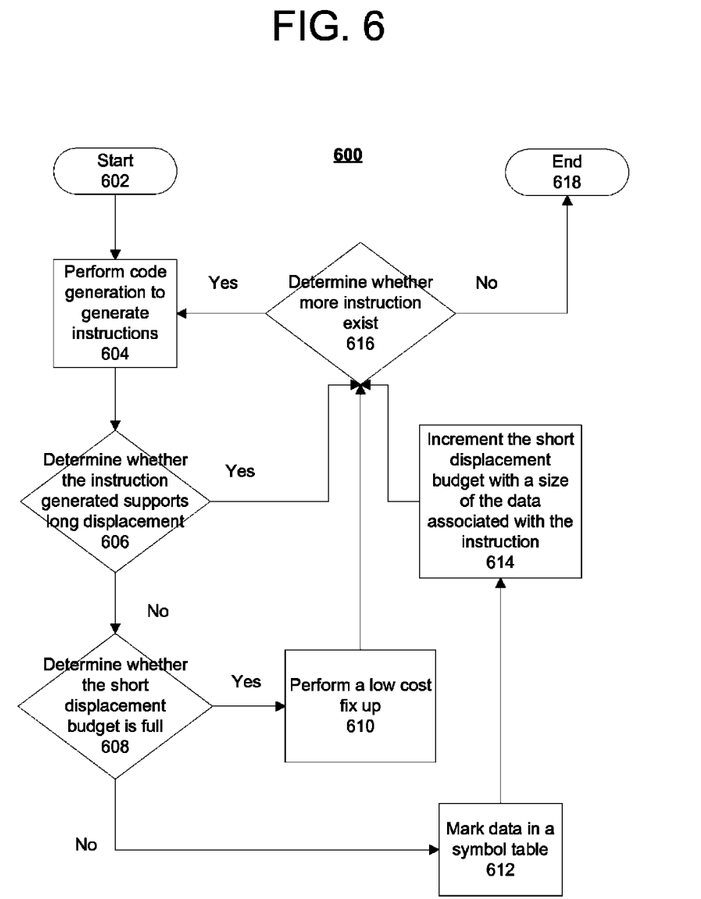
FIG. 6 is a flowchart of a displacement fix up block of displacement fix up system of FIG. 3 in accordance with one embodiment of the disclosure.

With reference to FIG. 6 a flowchart of a displacement fix up block of displacement fix up system of FIG. 3 in accordance with one embodiment of the disclosure is presented. Method 600 is an example of a block using displacement fix up system 300 of FIG. 3.

Method 600 begins (block 602) and performs code generation to generate instructions (block 604). A compiler performing the instruction generation from source code performs code generation. Method 600 determines whether the instruction (being) generated supports long displacement (block 606). Responsive to a determination that the instruction generated supports long displacement, method 600 determines whether more instructions exist (block 616). Responsive to a determination that more instructions exist method 600 returns to block 604 as before. Responsive to a determination that no more instructions exist method 600 terminates (block 618).

Responsive to a determination that the instruction generated does not support long displacement, method 600 determines whether a short displacement budget is full (block 608). A short displacement budget is a configurable predetermined value representative of a particular implementation of an instruction set supported data size. For example, in this case 4K and in another case perhaps 2K or larger size and is typically platform specific.

Responsive to a determination that the short displacement budget is full, method 600 performs a low cost fix up. In one embodiment, a typical low cost fix would apply or insert a long displacement load instruction (block 610). In the examples used the long displacement load instruction is a LAY instruction that is inserted into the instruction being generated. As illustrated in FIG. 6 the example uses an instruction set of the z/OS system architecture, other platforms may not use a LAY instruction but provide a similar instruction. Method 600 determines whether more instructions exist (block 616) as before.

Responsive to a determination that the short displacement budget is not full, method 600 marks the data associated with the instant instruction in a symbol table (block 612). The compiler performing the instruction generation from source code uses the symbol table. Method 600 increases or increments the short displacement budget by a size of the data associated with the instant instruction (block 614). For example, if the current short displacement budget was 2K and the size of the data associated with the instruction was 0.5K the new budget amount would be 2.5K. If the short displacement budget were set at 4K, there would be an amount of 1.5K remaining in the budget.

Method 600 determines whether more instructions exist (block 616) as before.

Figure 7:
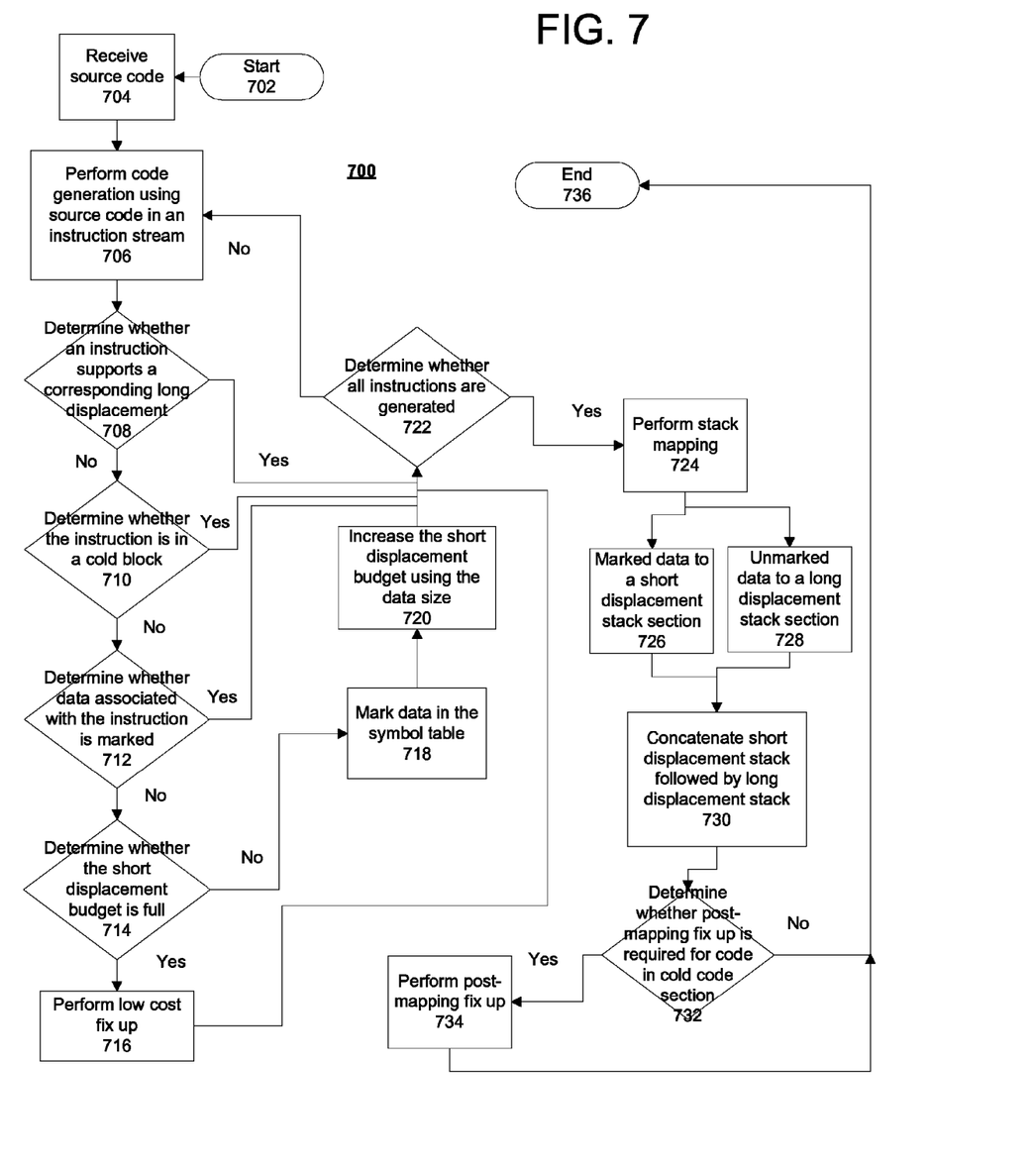
FIG. 7 is a flowchart of a displacement fix up block of displacement fix up system of FIG. 3 in accordance with one embodiment of the disclosure.

With reference to FIG. 7 a flowchart of a displacement fix up block of displacement fix up system of FIG. 3 in accordance with one embodiment of the disclosure is presented. Method 700 is an example of a block using displacement fix up system 300 of FIG. 3. As illustrated in FIG. 7 the example uses an instruction set of the z/OS system architecture, other platforms may not use the same instruction but provide a similar instruction type of the example.

Method 700 begins (block 702) and initializes a short displacement budget to zero as well as initializing all data as unmarked. Method 700 receives source code as input (block 704). Method 700 performs code generation using the source code received as an instruction stream (block 706).

Method 700 determines whether an instruction (being processed) supports a corresponding long displacement (block 708). Responsive to a determination that the instruction supports a corresponding long displacement, method 700 skips ahead to determine whether all instructions are generated (block 722).

Responsive to a determination that the instruction does not support long displacement, (for example, MVC, CLC instructions in z/OS) method 700 determines whether the instruction is generated in a cold block (for example, an infrequently executed section of the code) (block 710). Responsive to a determination that the instruction is generated in a cold block method 700 skips ahead to perform block 722 and waits until a post-mapping stage to determine whether an expensive fix up is needed, and when needed perform the expensive fix up.

Responsive to a determination that the instruction is not generated in a cold block method 700 determines whether data used with the instruction is marked (block 712). Responsive to a determination that the data used with the instruction is marked; method 700 skips ahead to determine whether all instructions are generated (block 722). Responsive to a determination that the data used with the instruction is not marked; method 700 determines the short displacement budget is full (block 714). The determination is made regarding a predetermined value being exceeded, as in the example of a 4K budget being a threshold value. The budget value as previously defined is a configurable value determined by an instruction set specification for instructions being processed.

Responsive to a determination that the short displacement budget is not full method 700 marks data that this instruction is using in the symbol table (block 718). As part of the data marking operation, method 700 increments the short displacement budget by a size of the data associated with the instruction (block 720). Responsive to a determination that the short displacement budget is full, the data is not marked and method 700 performs a low cost fix up (block 716). In this example, a low cost fix up typically comprises an addition of a LAY instruction (or similar instruction available in the particular instruction set).

Method 700 determines whether all instructions are generated (block 722). Responsive to a determination that all instructions are not generated, method 700 returns to block 706 to block remaining instructions. Responsive to a determination that all instructions are generated, method 700 proceeds to perform stack mapping (block 724). Method 700 separately maps short displacement data (for example, all data marked previously) in a short displacement stack section (block 726). Similarly, method 700 maps long displacement data (all unmarked data) in a long displacement stack section (block 728). Method 700 performs a final stack mapping by a concatenation of the short displacement stack section followed by the long displacement stack section (block 730).

Method 700 determines whether post-mapping fix up is required only for code in the cold code section (block 732). Responsive to a determination that post-mapping fix up is required; method 700 performs the post-mapping fix as required (block 734) and terminates thereafter (block 736). Responsive to a determination that post-mapping fix up is not required; method 700 terminates thereafter (block 736).

Figure 8:
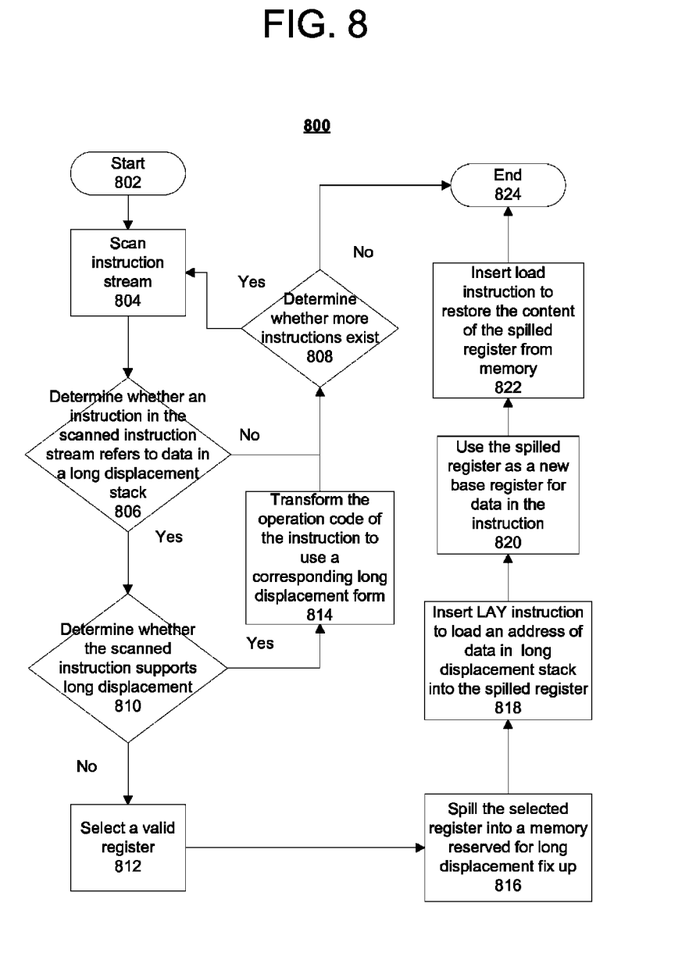
FIG. 8 is a flowchart of a block of post-mapping fix up using displacement fix up system of FIG. 3 in accordance with one embodiment of the disclosure.

With reference to FIG. 8 a flowchart of a block of post-mapping fix up using displacement fix up system of FIG. 3 in accordance with one embodiment of the disclosure is presented. Method 800 is an example of post-mapping fix up using displacement fix up system 300 of FIG. 3. As illustrated in FIG. 8 the example uses an instruction set of the z/OS system architecture, other platforms may not use the same instructions but provide a similar instruction type of the example.

For example, when encountering instructions in the cold code block section, method 800 starts (block 802) and scans the instruction stream (block 804). Method 800 determines whether an instruction in the scanned instruction stream refers to data in a long displacement stack (block 806). Responsive to a determination that instruction does not refer to data in the long displacement stack, method 800 determines whether more instructions exist (block 808).

Responsive to a determination that more instructions exist, method 800 returns to block 804 as before. Responsive to a determination that no more instructions exist, method 800 terminates thereafter (block 824).

Responsive to a determination that instruction refers to data in the long displacement stack, method 800 determines whether the instruction supports the referenced displacement, as in the long displacement (block 810). A determination of whether the scanned instruction supports long displacement, means determining whether the instruction is a short displacement instruction for which there is a corresponding long displacement instruction. For example, instructions L/ST/LA are short displacement instructions having corresponding long displacement instructions. Responsive to a determination that the instruction does support the referenced displacement, method 800 transforms the operation code of the instruction to a corresponding long displacement form of operation code (block 814). Method 800 returns to block 808 as before. Responsive to a determination that the instruction does not support the referenced displacement, method 800 selects a valid register (block 812). In this case a valid register is defined as a register that is not a linkage register, and not a register that is referred to in the instant instruction.

Method 800 spills the selected register into a memory slot preserved for long displacement fix-ups (block 816). Method 800 inserts a LAY (long displacement instruction using the z/OS instruction set of the examples) instruction to load the address of the data in the long displacement stack into the spilled register (block 818). Method 800 uses the spilled register as a new base register for the data in the instruction (block 820). Method 800 inserts a load instruction to restore the content of the spilled register from memory (block 822) and terminates thereafter (block 824).

Previously described method 600 avoids the occurrence of using method 800 in a warm block code section, because after generation the instructions any data in the long displacement stack should be referred by an instruction that supports long displacement. Even though after generation of instructions, temps may be generated during local register allocation, these particular temps should go into the long displacement stack.

There is a difference between the fix-ups performed in method 600 and fix ups performed in method 800 in that method 600 fix up occurs before local register allocation, so spilling of a register is not necessary, while in method 800 fix ups occur after local register allocation so a register must be spilled to preserve correctness.

In method 600 for each memory data that needs fix-up, a need exists to insert one more LAY instruction, but in method 800 there is a need to insert three more instructions (one LAY and a pair of load and store instructions for register spilling) for one memory data fix-up, which is much more expensive regarding performance. Another performance benefit occurs with method 600 because it occurs before scheduling, so that new instructions are not inserted into the instruction stream after scheduling.

Thus is presented in an illustrative embodiment a computer-implemented block for generating short displacement instructions. The illustrative embodiment comprises performing code generation by a compiler to generate an instruction, determining, by a computer, whether the generated instruction supports long displacement and responsive to a determination that the generated instruction does not support long displacement, determining whether a short displacement budget is full. Responsive to a determination that the short displacement budget is not full, mark data associated with the instruction in a symbol table maintained by the compiler, increment the short displacement budget using a size of the marked data associated with the instruction and responsive to a determination that the short displacement budget is full, perform a low cost fix up.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or block plus function elements in the claims below are intended to include any structure, material, or act for performing the function in combination with other claimed elements as specifically claimed. The description has been presented for purposes of illustration and description, but is not intended to be exhaustive or limited in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various embodiments can take the form of an entirely hardware embodiment, an entirely software embodiment or an embodiment containing both hardware and software elements. Some embodiments are implemented in software, which includes but is not limited to firmware, resident software, microcode, and other software media that may be recognized by one skilled in the art.

It is important to note that while various embodiments have been described in the context of a fully functioning data processing system, those of ordinary skill in the art will appreciate that the processes of various embodiments are capable of being distributed in the form of a computer readable data storage medium having computer executable instructions stored thereon in a variety of forms. Examples of computer readable data storage media include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

It will be clear to one of ordinary skill in the art that all or part of the method of various embodiments may suitably and usefully be embodied in additional logic apparatus or additional logic apparatuses, comprising logic elements arranged to perform the blocks of the method and that such logic elements may comprise additional hardware components, firmware components or a combination thereof.

It will be equally clear to one of skill in the art that some or all of the functional components of various embodiments may suitably be embodied in alternative logic apparatus or apparatuses comprising logic elements to perform equivalent functionality using equivalent method blocks, and that such logic elements may comprise components such as logic gates in, for example a programmable logic array or application-specific integrated circuit. Such logic elements may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

Various embodiments may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infra-red or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infra-red, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Various embodiments may be realized in the form of a computer implemented method of deploying a service comprising blocks of deploying computer program code operable to, when deployed into a computer infrastructure and executed thereon, cause the computer system to perform all the blocks of the method.

Various embodiments may be realized in the form of a data carrier having functional data thereon, said functional data comprising functional computer data structures to, when loaded into a computer system and operated upon thereby, enable said computer system to perform all the blocks of the method.

It will be clear to one skilled in the art that many improvements and modifications can be made to the foregoing exemplary embodiment without departing from the scope of the present invention.

What is claimed is:

1. A computer-implemented method for generating short displacement instructions, comprising:
   performing code generation by a compiler to generate an instruction;
   determining, by a computer, whether the generated instruction supports long displacement;
   based on a determination that the generated instruction does not support long displacement, determining whether a short displacement budget is full;
   based on a determination that the short displacement budget is not full, marking data associated with the instruction in a symbol table maintained by the compiler;
   incrementing the short displacement budget using a size of the marked data associated with the instruction;
   based on a determination that the short displacement budget is full, performing a low cost fix up; and
   performing stack mapping, the stack mapping comprising:
      mapping marked data to a short displacement stack section;
      mapping unmarked data to a long displacement stack section; and
      concatenating the short displacement stack section with the long displacement stack section.

2. The computer-implemented method of claim 1, wherein determining whether the generated instruction supports long displacement further comprises:
   determining whether the generated instruction is in a cold block; and
   based on a determination that the generated instruction is not in a cold block:
      determining whether data associated with generated instruction is marked,
      based on a determination that the generated instruction is marked, determining whether all instructions are generated;
      based on a determination that the generated instruction is in a cold block, determining whether all instructions are generated; and
      based on to a determination that all instructions are generated, awaiting a result of stack mapping.

3. The computer-implemented method of claim 1, wherein performing stack mapping further comprises:
   determining whether post-mapping fix up is required; and
      based on a determination that post-mapping fix up is required, performing a predefined sequence of operations to generated instructions.

4. The computer-implemented method of claim 3, wherein performing the predefined sequence of operations to generated instructions further comprises:
   scanning an instruction stream;
   determining whether an instruction in the scanned instruction stream refers to data in a long displacement stack;
   based on a determination that the scanned instruction stream refers to data in a long displacement stack, determining whether the scanned instruction does not support a long displacement;
   based on a determination that the scanned instruction does not support the long displacement, selecting a valid register;
   spilling the selected register into a memory reserved for long displacement fix up;
   inserting a predetermined instruction to load an address of data in the long displacement stack into the spilled register;
   using the spilled register as a new base register for data in the instruction; and
   inserting a set of instructions to restore content of the spilled register from memory.

5. The computer-implemented method of claim 1, wherein performing the low cost fix up further comprises:
   performing the low cost fix up before local register allocation.

6. The computer-implemented method of claim 1, wherein determining whether a short displacement budget is full further comprises:
   determining whether a predetermined budget value is exceeded, wherein the predetermined budget value is previously defined as a configurable value determined by an instruction set specification for instructions being processed.

7. A computer program product for generating short displacement instructions, the computer program product comprising a non-transitory computer readable medium having computer-readable program code embodied therewith, which when executed by a computer processor, causes the computer processor to implement:
   performing code generation by a compiler to generate an instruction;
   determining whether the generated instruction supports long displacement;
   based on a determination that the generated instruction does not support long displacement, determining whether a short displacement budget is full;
   based on a determination that the short displacement budget is not full, marking data associated with the instruction in a symbol table maintained by the compiler;
   incrementing the short displacement budget using a size of the marked data associated with the instruction;
   based on a determination that the short displacement budget is full, performing a low cost fix up; and
   performing stack mapping, the stack mapping comprising:
      mapping marked data to a short displacement stack section;
      mapping unmarked data to a long displacement stack section; and
      concatenating the short displacement stack section with the long displacement stack section.

8. The computer program product of claim 7, wherein determining whether the generated instruction supports long displacement further comprises:
   determining whether the generated instruction is in a cold block; and
   based on a determination that the generated instruction is not in a cold block:
      determining whether data associated with generated instruction is marked,
      based on a determination that the generated instruction is marked, determining whether all instructions are generated;
      based on a determination that the generated instruction is in a cold block, determining whether all instructions are generated; and
      based on to a determination that all instructions are generated, awaiting a result of stack mapping.

9. The computer program product of claim 7, wherein performing stack mapping further comprises:
   determining whether post-mapping fix up is required; and
      based on a determination that post-mapping fix up is required, performing a predefined sequence of operations to generated instructions.

10. The computer program product of claim 9, wherein performing the predefined sequence of operations to generated instructions further comprises:

scanning an instruction stream;
determining whether an instruction in the scanned instruction stream refers to data in a long displacement stack;
based on a determination that the scanned instruction stream refers to data in a long displacement stack, determining whether the scanned instruction does not support a long displacement;
based on a determination that the scanned instruction does not support the long displacement, selecting a valid register;
spilling the selected register into a memory reserved for long displacement fix up;
inserting a predetermined instruction to load an address of data in the long displacement stack into the spilled register;
using the spilled register as a new base register for data in the instruction; and
inserting a set of instructions to restore content of the spilled register from memory.

11. The computer program product of claim 7, wherein performing the low cost fix up further comprises:
performing the low cost fix up before local register allocation.

12. The computer program product of claim 7, wherein determining whether a short displacement budget is full further comprises:
determining whether a predetermined budget value is exceeded, wherein the predetermined budget value is previously defined as a configurable value determined by an instruction set specification for instructions being processed.

13. An apparatus for generating short displacement instructions comprising:
a communications fabric;
a memory connected to the communications fabric, wherein the memory contains computer executable program code;
a communications unit connected to the communications fabric;
an input/output unit connected to the communications fabric;
a display connected to the communications fabric; and
a processor unit connected to the communications fabric, wherein the processor unit executes the computer executable program code to direct the apparatus to:
perform code generation by a compiler to generate an instruction;
determine whether the generated instruction supports long displacement;
based on a determination that the generated instruction does not support long displacement, determine whether a short displacement budget is full;
based on a determination that the short displacement budget is not full, mark data associated with the instruction in a symbol table maintained by the compiler;
increment the short displacement budget using a size of the marked data associated with the instruction;
based on a determination that the short displacement budget is full, perform a low cost fix up; and
perform stack mapping, the stack mapping comprising:
mapping marked data to a short displacement stack section;
mapping unmarked data to a long displacement stack section; and
concatenating the short displacement stack section with the long displacement stack section.

14. The apparatus of claim 13, wherein the processor unit executes the computer executable program code to determine whether the generated instruction supports long displacement further directs the apparatus to:
determine whether the generated instruction is in a cold block;
based on a determination that the generated instruction is not in a cold block, determine whether data associated with generated instruction is marked,
based on a determination that the generated instruction is marked, determine whether all instructions are generated; and
based on a determination that the generated instruction is in a cold block:
determine whether all instructions are generated; and
based on a determination that all instructions are generated, await a result of stack mapping.

15. The apparatus of claim 13, wherein the processor unit executes the computer executable program code to perform stack mapping further directs the apparatus to:
determine whether post-mapping fix up is required; and
based on a determination that post-mapping fix up is required, perform a predefined sequence of operations to generated instructions.

16. The apparatus of claim 15 wherein the processor unit executes the computer executable program code to perform the predefined sequence of operations to generated instructions further directs the apparatus to:
scan an instruction stream;
determine whether an instruction in the scanned instruction stream refers to data in a long displacement stack;
based on a determination that the scanned instruction stream refers to data in a long displacement stack, determine whether the scanned instruction does not support the long displacement;
based on a determination that the scanned instruction does not support the long displacement, select a valid register;
spill the selected register into a memory reserved for long displacement fix up;
insert a predetermined instruction to load an address of data in the long displacement stack into the spilled register;
use the spilled register as a new base register for data in the instruction; and
insert a set of instructions to restore content of the spilled register from memory.

17. The apparatus of claim 13 wherein the processor unit executes the computer executable program code to determine whether a short displacement budget is full further directs the apparatus to:
determine whether a predetermined budget value is exceeded, wherein the predetermined budget value is previously defined as a configurable value determined by an instruction set specification for instructions being processed.

* * * * *